(12) United States Patent
Blankenburg et al.

(10) Patent No.: US 9,816,050 B2
(45) Date of Patent: Nov. 14, 2017

(54) OIL EXTRACTION METHOD AND COMPOSITION FOR USE IN THE METHOD

(71) Applicants: Dean Blankenburg, West Bend, WI (US); Scott Cumming, Sun Prairie, WI (US); Frank Zouras, Pewaukee, WI (US); John Vassh, Shorewood, WI (US)

(72) Inventors: Dean Blankenburg, West Bend, WI (US); Scott Cumming, Sun Prairie, WI (US); Frank Zouras, Pewaukee, WI (US); John Vassh, Shorewood, WI (US)

(*) Notice: Subject to any disclaimer, the term of this patent is extended or adjusted under 35 U.S.C. 154(b) by 0 days.

(21) Appl. No.: 14/921,333

(22) Filed: Oct. 23, 2015

(65) Prior Publication Data
US 2016/0115425 A1    Apr. 28, 2016

Related U.S. Application Data

(60) Provisional application No. 62/068,977, filed on Oct. 27, 2014.

(51) Int. Cl.
*C11B 1/00* (2006.01)
*C11B 13/00* (2006.01)
(Continued)

(52) U.S. Cl.
CPC ............ *C11B 13/00* (2013.01); *B01D 17/047* (2013.01); *C11B 1/10* (2013.01); *Y02E 50/17* (2013.01); *Y02W 30/74* (2015.05)

(58) Field of Classification Search
CPC ......... C11B 13/00; C11B 1/10; B01D 17/047; Y02W 30/74; Y02E 50/17
(Continued)

(56) References Cited

U.S. PATENT DOCUMENTS

| | | | |
|---|---|---|---|
| 2,367,384 | A | 1/1945 | Tymstra et al. |
| 4,029,596 | A | 6/1977 | Fink et al. |

(Continued)

FOREIGN PATENT DOCUMENTS

| | | |
|---|---|---|
| JP | 55056177 | 4/1980 |
| JP | 07215828 | 8/1995 |

(Continued)

OTHER PUBLICATIONS

Machine translation of JP,07-215828,A.
(Continued)

*Primary Examiner* — Deborah D Carr

(57) ABSTRACT

A demulsifying composition is disclosed for aiding extraction of an emulsified oil from an oil and water emulsion. The composition includes one or more non-ionic surfactants having a HLB value of 6 or greater, wherein the non-ionic surfactant is selected from the group consisting of alkoxylated plant oils, alkoxylated plant fats, alkoxylated animal oils, alkoxylated animal fats, alkyl polyglucosides, alkoxylated glycerols, and mixtures thereof. The composition may include silicon containing particles. A method for recovering oil from a corn to ethanol process is also disclosed. The method includes the steps of adding the composition to a process stream of the corn to ethanol process, and extracting oil from the process stream.

28 Claims, 2 Drawing Sheets

(51) Int. Cl.
B01D 17/04 (2006.01)
C11B 1/10 (2006.01)

(58) Field of Classification Search
USPC .......................................................... 554/20
See application file for complete search history.

(56) References Cited

U.S. PATENT DOCUMENTS

| | | | |
|---|---|---|---|
| 4,702,798 | A | 10/1987 | Bonanno |
| 4,844,980 | A | 7/1989 | Gruning et al. |
| 5,096,617 | A | 3/1992 | Ball et al. |
| 5,283,322 | A | 2/1994 | Martin et al. |
| 5,328,692 | A | 7/1994 | Dana |
| 5,431,852 | A | 7/1995 | Kaijou |
| 5,558,781 | A | 9/1996 | Buchold et al. |
| 5,861,451 | A | 1/1999 | Schroeder et al. |
| 6,200,940 | B1 | 3/2001 | Vitomir |
| 6,201,142 | B1 | 3/2001 | Maza |
| 6,548,102 | B2 | 4/2003 | Fenske et al. |
| 6,767,124 | B2 | 7/2004 | Shikami et al. |
| 7,601,858 | B2 | 10/2009 | Cantrell et al. |
| 8,008,517 | B2 | 8/2011 | Cantrell et al. |
| 8,168,037 | B2 | 5/2012 | Winsness |
| 8,192,627 | B2 | 6/2012 | Gallop et al. |
| 8,962,059 | B1 | 2/2015 | Froderman et al. |
| 2008/0176298 | A1 | 7/2008 | Randhava et al. |
| 2010/0256244 | A1 | 10/2010 | Rey et al. |
| 2011/0319557 | A1 | 12/2011 | Kojima et al. |
| 2012/0125859 | A1 | 5/2012 | Collins et al. |
| 2012/0245370 | A1 | 9/2012 | Sheppard et al. |
| 2012/0255887 | A1 | 10/2012 | Holms et al. |
| 2013/0292339 | A1 | 11/2013 | Hartmann et al. |
| 2014/0155639 | A1 | 6/2014 | Sticklen et al. |
| 2014/0171670 | A1* | 6/2014 | Jenkins ............... C11B 13/00 554/19 |
| 2014/0275589 | A1 | 9/2014 | Blankenburg et al. |

FOREIGN PATENT DOCUMENTS

| | | |
|---|---|---|
| WO | 2012084448 | 6/2012 |
| WO | 2013173447 | 11/2013 |

OTHER PUBLICATIONS

Portet, F., et al., Nonideality of Mixtures of Pure Nonionic Surfactants Both in Solution and at Silica/Water Interfaces, 1996, Journal of Colloid and Interface Science, vol. 184, pp. 216-226.

JP 55056177, Takayama, S. et al., Surface Coating Anti Fogging Agent, 1980. English abstract, 2 pages.

JP 07215828, Arai, K. et al., Detergent composition, 1995, English abstract, 3 pages.

S. Kadioglu et al., Surfactant-Based Oil Extraction of Corn Germ; 88 J. Am. Oil Chem Soc; pp. 863-869 (2011).

A. Hahn et al., Mechanism of Demulsification of Oil-In-Water Emulsion in the Centrifuge; 257 Colloid & Polymer Sci., pp. 959-967 (1979).

G. Murthy et al., Improvement in Fermentation Characteristics of Degermed Ground Corn by Lipid Supplementation; 33 J. Ind. Microbiol. Biotechnol, pp. 655-660 (2006).

George Alther, "Put the Breaks On", Chemical Engineering, vol. 5, No. 3 (Mar. 1998).

"The HLB System A Time-Saving Guide to Emulsifier Selection", ICI Americas Inc. (Mar. 1980).

Thesis; by Mohammadali Safavieh; Bio-Ethanol Plant: Problems of Stillage Separation; the State University of New York at Buffalo, dated Apr. 22, 2008.

* cited by examiner

OIL EXTRACTION METHOD AND COMPOSITION FOR USE IN THE METHOD

CROSS-REFERENCES TO RELATED APPLICATIONS

This application claims priority to U.S. Patent Application No. 62/068,977 filed Oct. 27, 2014.

STATEMENT REGARDING FEDERALLY SPONSORED RESEARCH

Not Applicable.

BACKGROUND OF THE INVENTION

1. Field of the Invention

The invention relates to compositions and methods for aiding the extraction of an emulsified oil from an oil and water emulsion.

2. Description of the Related Art

Most commercial corn oil is produced by front end fractionation of corn germ during the wet mill corn process. Recently, a new source of corn oil has arisen as a by-product of the dry-mill process used in the ethanol industry. Dry milling is a process requiring less energy and less capital investment than wet-milling. Though corn oil captured at the tail-end of a dry mill process is not suitable for food use, it can be used as a biodiesel feedstock.

In the dry-mill ethanol process, yellow dent corn is milled, liquefied and sent to a fermenter. Enzymes and yeast are added to convert starch into ethanol, which is subsequently distilled off. This leaves a slurry called whole stillage. Whole stillage, which contains a concentrated oil fraction, is then separated via centrifugation into liquid and solid fractions called thin stillage and wet cake respectively. While part of the thin stillage is recycled to help liquefy the milled corn, the rest is concentrated via evaporation into thick stillage (or syrup), which is dried and mixed with the wet cake to form distillers' dried gains with solubles (DDGS). This is sold as cattle feed and is a good source of protein.

Due to the concentrating effect dry-milling has on the oil fraction, corn oil extracted from thick stillage has become a profitable co-product for the ethanol industry. Although removing corn oil lowers the energy density of DDGS, some studies suggest that high oil content in DDGS interferes with milk production in dairy cattle, and leads to undesirable pork bellies in swine. Therefore, removing some of the oil not only leads to a valuable co-product, but also may improve DDGS quality.

Current methods of extracting corn oil from thick stillage include solvent extraction (often hexane) and decantation. Hexane extraction, though effective, is energy intensive and requires a large amount of capital investment. Decantation requires little capital investment and has the potential of being just as effective as hexane extraction.

Decantation, using centrifuges takes advantage of the density difference between the oil and the aqueous phase to create buoyant force on the oil suspended in solution. In order for the buoyant force to be strong enough to overcome the interfacial interactions and surface friction acting on the oil, individual oil droplets must be large enough so that sufficient force can be generated. The current separation devices used in industry can separate particles as small as twenty micrometers in diameter. The success of current corn oil decantation is highly dependent on upstream processing conditions. Plants using high temperature, high or low pH, smaller grind, and long periods of retention tend to have increased oil yields.

However, there still exists a need for improved methods for recovering corn oil from byproducts of the dry-mill process used in the ethanol industry.

SUMMARY OF THE INVENTION

The present invention addresses the foregoing needs by providing a composition for aiding extraction of an emulsified oil from an oil and water emulsion. The composition may include a non-ionic surfactant selected from alkoxylated plant oils, alkoxylated plant fats, alkoxylated animal oils, alkoxylated animal fats, alkyl polyglucosides, alkoxylated glycerols, and mixtures thereof. The composition may include silicon containing particles. A method for recovering oil from a corn to ethanol process is also provided. The method includes the steps of adding the composition to a process stream of the corn to ethanol process, and extracting oil from the process stream.

These and other features, aspects, and advantages of the present invention will become better understood upon consideration of the following detailed description, drawings, and appended claims.

DETAILED DESCRIPTION OF THE INVENTION

Figure 1:
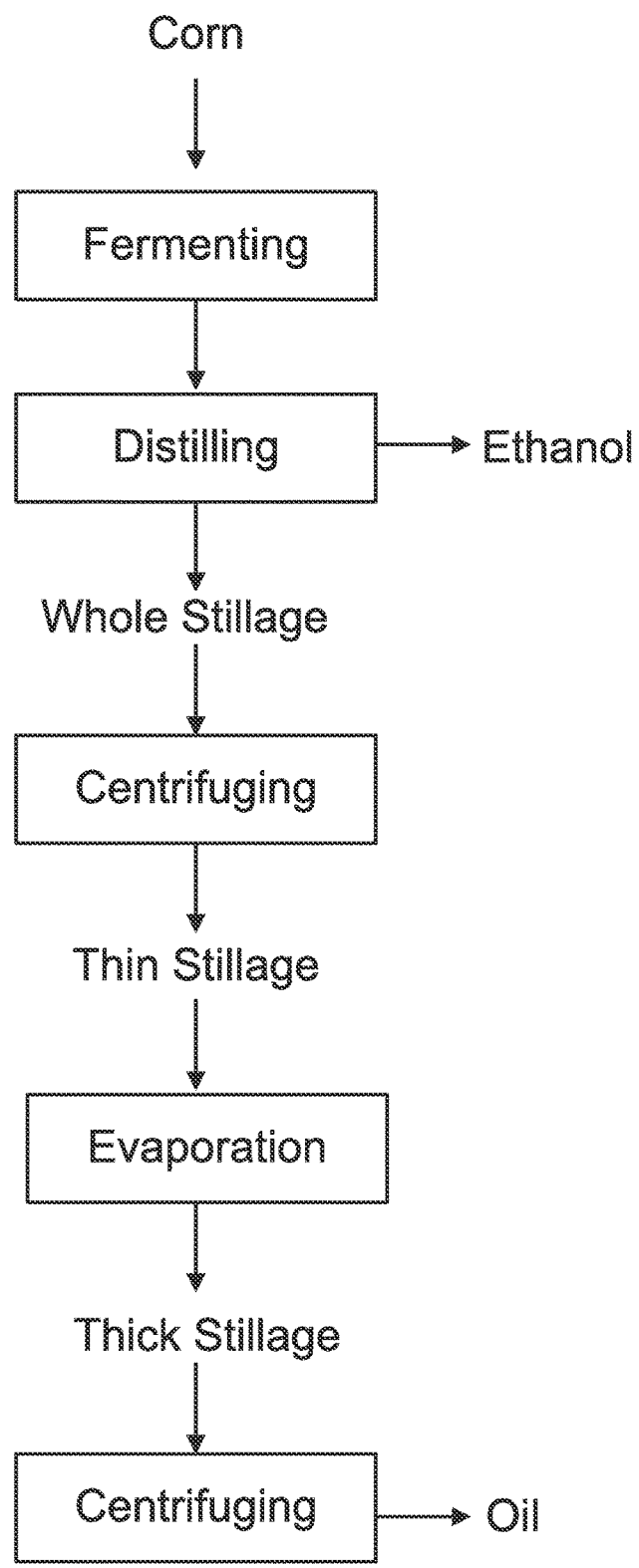
FIG. 1 is a process flow diagram showing a dry-mill ethanol process.

To provide context for the invention, FIG. 1 shows an example a dry-mill ethanol process. Corn is fermented, and ethanol is distilled off. This leaves whole stillage which is separated via centrifuging into a solid fraction and a liquid fraction called thin stillage. The thin stillage is concentrated via evaporation into thick stillage, which can be processed in a centrifugal decanter to separate out the corn oil.

In thick stillage, oil is likely present in four forms: (1) oil-in-water emulsion stabilized by proteins and phospholipids; (2) minute oil droplets that are bound in a matrix of intact and denatured hydrophobic proteins and cell wall components; (3) oil in intact oil bodies released from broken cells; and (4) oil in intact oil bodies in the unbroken endosperm and germ particles. The upstream processing conditions (temperature, pH, etc. . . . ) in the ethanol plant will determine the distribution of oil among these four forms, thus altering the ability of the decanter (e.g., a centrifugal decanter) to separate out the oil.

Oil bodies are the biological structures in which oil, in the form of triglycerides, is contained within the cells of certain seeds. Their purpose is to prevent oil coalescence even in the event of extreme desiccation, an essential step in seed maturation. Though oil bodies are often packed very tightly, they are prevented from coalescing by a highly specialized surface active protein called oleosin. Oleosin is strongly anchored on the surface of the oil body by a long hydrophobic portion. This portion is folded into a hairpin like structure and extends into the oil. On either side are amphiphilic portions which extend over the surface of the oil body, and act to shield the oil body from coalescence via steric and electrostatic hindrance. The estimated size of oil bodies in corn germ is 0.3-1.5 micrometers, significantly smaller than the minimum size requirement for horizontal decanters. Thus, significant coalescence must occur before successful decantation.

Coalescence of two oil droplets in the thick stillage can be broken into two steps. First, the surface of two oil droplets must come into contact with each other. For this to happen, the oil droplets have to be mobile and at least part of the surface must be free of debris that would sterically hinder their progression towards one another. The second step requires that droplets actually coalesce once they come into contact with each other. This depends on the stability of the droplet resulting from biological surfactants (i.e., oleosins and phospholipids). If the droplet is completely covered by intact oleosins, the likelihood of coalescence is minimal.

The present invention breaks the oil-in-water emulsion that is stabilized by proteins and phospholipids such that significant corn oil coalescence can occur before decantation. The oil-in-water emulsion can be present in whole stillage, and/or thin stillage, and/or thick stillage in the dry-mill ethanol process.

Figure 2:
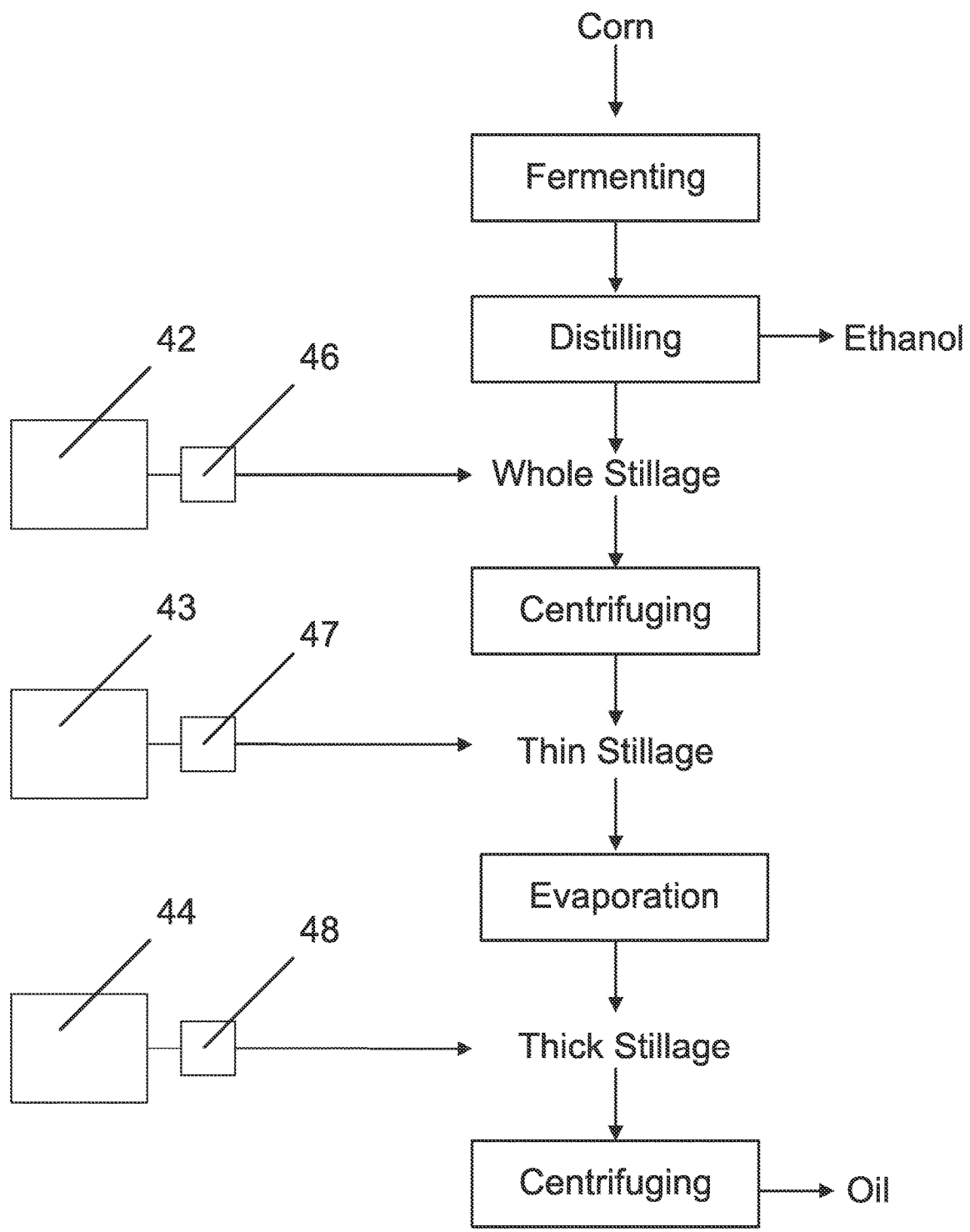
FIG. 2 is a process flow diagram showing an example method of corn oil extraction according to the invention.

Referring now to FIG. 2, there is shown a process flow diagram showing an example method of oil extraction according to the invention. In the method of FIG. 2, a composition of the invention is added to the whole stillage, and/or the thin stillage, and/or the thick stillage such that significant corn oil coalescence can occur before separation of the corn oil by centrifuging or decantation. This increases the amount of corn oil recovered during centrifuging and/or decantation.

In the method of FIG. 2, a demulsifying composition including a non-ionic surfactant is contained in vessels 42, 43, 44. Metering devices, which in one non-limiting example can be pumps 46, 47, 48, meter dispersions of the demulsifying composition into the whole stillage, and/or the thin stillage, and/or the thick stillage. Any combination of the vessels 42, 43, 44 can be used in the method of FIG. 2. The addition of the demulsifying composition leads to significant corn oil coalescence before separation of the corn oil by centrifuging or decantation. This increases the amount of corn oil recovered during separation which can be accomplished using various means such as centrifuging and/or decantation.

In the method of FIG. 2, the demulsifying composition may also include silicon containing particles which may be selected, for example, from silica, talc, clay, diatomaceous earth, and mixtures thereof. The silicon containing particles can be precipitated or fumed. The silicon containing particles can be hydrophilic or hydrophobic. Preferably, the silicon containing particles are precipitated hydrophilic silica particles. The silicon containing particles can have an average particle size of less than 100 micrometers, more preferably an average particle size of less than 50 micrometers, and most preferably an average particle size of less than 20 micrometers.

The silicon containing particles can be present in the demulsifying composition at a level of 0.1 wt. % to 30 wt. %, more preferably, a level of 5 wt. % to 15 wt. %, and most preferably, at a level of up to 15 wt. %. The silicon containing particles can be dispersed in the demulsifying composition under high shear in the vessels 42, 43, 44. The silicon containing particles can be dispersed using milling, homogenizing, or ultrasonic means. The silicon containing particles can also be dispersed using a suspending agent. In one non-limiting example, the suspending agent is selected from gums or celluloses. Compounds such as gums or celluloses thicken the mixture in the vessels 42, 43, 44 to prevent the silicon containing particles from settling out. The suspending agent can be present in the demulsifying composition at a level of 1 wt. % to 30 wt. %, more preferably, a level of 4 wt. % to 15 wt. %, and most preferably, at a level of up to 15 wt. %.

The use of silicon containing particles is not required. A demulsifying composition including a non-ionic surfactant, but not including silicon containing particles, can be contained in vessels 42, 43, 44 and metered into the whole stillage, and/or the thin stillage, and/or the thick stillage.

In one embodiment of the method of FIG. 2, pumps 46, 47, 48 are controlled such that the demulsifying composition is added to the whole stillage and/or the thin stillage and/or the thick stillage to create a water-based composition having significantly lower viscosity than other compositions, particularly at temperatures between 32° F. and 50° F.

While corn oil extraction is shown in FIG. 2, the method is suitable for the extraction of other oils that are emulsified. For example, the oil can be a vegetable oil, an animal oil, an animal fat, petroleum oil, and mixtures thereof. The vegetable oil may be emulsified by a biological surfactant comprising phospholipids and proteins.

In the method of FIG. 2, one embodiment of the demulsifying composition may comprise a non-ionic surfactant selected from the group consisting of alkoxylated plant oils, alkoxylated plant fats, alkoxylated animal oils, alkoxylated animal fats, alkylpolyglucosides, alkoxylated glycerols, and mixtures thereof. The non-ionic surfactant can have a Hydrophilic-Lipophilic Balance (HLB) value of 6 or greater, or 8 or greater, or 10 or greater, or 11 or greater, or 12 or greater, or 13 or greater, or 14 or greater, or 15 or greater, or 16 or greater. When using a mixture of non-ionic surfactants, the mixture of non-ionic surfactants can have an HLB value of 6 or greater, or 8 or greater, or 10 or greater, or 11 or greater, or 12 or greater, or 13 or greater, or 14 or greater, or 15 or greater, or 16 or greater.

The term "alkoxylated" is used herein as an adjective that describes a material as having been a reactant in a chemical reaction during which alkoxy groups were added to the material. An alkoxy functional group (or alkyl oxide) is an alkyl group singular bonded to oxygen. The simplest alkoxy groups are methoxy ($CH_3O$—), ethoxy ($CH_3CH_2O$—), propoxy ($CH_3CH_2CH_2O$—), and isopropoxy. The general form of an ethoxylation reaction is given as: ROH+n $C_2H_4O \rightarrow R(OC_2H_4)_nOH$. A polyoxyethylene group would have repeat units of oxyethylene (—$OC_2H_4$—) and is formed in an ethoxylation reaction using ethyl oxide.

Various plant oils, plant fats, animal oils and animal fats can be used in an alkoxylation reaction to produce the alkoxylated plant oils, alkoxylated plant fats, alkoxylated animal oils, and alkoxylated animal fats suitable for use as non-ionic surfactant of the demulsifying composition. The plant oils, plant fats, animal oils and animal fats may be edible. Physically, the plant oils and animal oils may be liquid at room temperature, whereas the plant fats and animal fats may be solid at room temperature. The plant oils and plant fats may be from vegetables, or nuts, or seeds (to the extent the seed is not also classified as a vegetable). The plant oils, plant fats, animal oils and animal fats may be Generally Recognized As Safe under the Federal Food, Drug, and Cosmetic Act. Non-limiting example plant oils, plant fats, animal oils and animal fats that can be used in an alkoxylation reaction to produce the alkoxylated plant oils, alkoxylated plant fats, alkoxylated animal oils, and alkoxylated animal fats include: castor oil, soybean oil, palm kernel oil, almond oil, corn oil, canola oil, rapeseed oil, and coconut oil, tallow, lard, white grease, and yellow grease.

The non-ionic surfactant of the demulsifying composition may be an alkoxylated plant oil selected from the group consisting of alkoxylated castor oil, alkoxylated soybean oil, alkoxylated palm kernel oil, alkoxylated almond oil, alkoxylated corn oil, alkoxylated canola oil, alkoxylated rapeseed oil, and alkoxylated coconut oil. The non-ionic surfactant of the demulsifying composition may be ethoxylated castor oil, ethoxylated soybean oil, ethoxylated palm kernel oil, ethoxylated almond oil, ethoxylated corn oil, ethoxylated canola oil, ethoxylated rapeseed oil, or ethoxylated coconut oil.

The alkoxylated plant oil can have an average degree of alkoxylation in a range of 5 moles to 60 moles of alkoxylation per mole of plant oil. The alkoxylated plant oil can have an average degree of alkoxylation in a range of 15 moles to 50 moles of alkoxylation per mole of plant oil. The alkoxylated plant oil can have an average degree of alkoxylation in a range of 20 moles to 40 moles of alkoxylation per mole of plant oil. Likewise, alkoxylated plant fats, alkoxylated animal oils, and alkoxylated animal fats can have the same ranges of alkoxylation.

In one non-limiting example, the alkoxylated plant oil is ethoxylated castor oil having an average degree of ethoxylation in a range of 15 moles to 45 moles of ethoxylation per mole of castor oil. Castor oil is a triester of glycerol and fatty acid chains where the average composition of the fatty acid chains is: ricinoleic acid 85-95%; oleic acid 2-6%; linoleic acid 1-5%; α-linolenic acid 0.5-1%; stearic acid 0.5-1%; palmitic acid 0.5-1%; dihydroxystearic acid 0.3-0.5%; and other fatty acids 0.2-0.5%.

When used as a non-ionic surfactant of the demulsifying composition, the alkoxylated plant oil, alkoxylated plant fat, alkoxylated animal oil, alkoxylated animal fat, or any mixtures thereof may be present in the demulsifying composition in a range of 5 weight % to 100 weight % of the demulsifying composition, or in a range of 10 weight % to 95 weight % of the demulsifying composition, or in a range of 10 weight % to 90 weight % of the demulsifying composition, or in a range of 10 weight % to 85 weight % of the demulsifying composition, or in a range of 10 weight % to 70 weight % of the demulsifying composition, or in a range of 10 weight % to 60 weight % of the demulsifying composition, or in a range of 10 weight % to 50 weight % of the demulsifying composition, wherein all weight percentages are percent by weight of the total demulsifying composition.

The non-ionic surfactant of the demulsifying composition may be an alkylpolyglucoside. Alkylpolyglucosides can be obtained by condensation of glucose with primary fatty alcohols having a $C_4$-$C_{20}$ (preferably $C_8$-$C_{18}$) alkyl group and a mean number of glucose units of the order of 0.5 to 3, preferably of the order of 1.1 to 1.8, per mole of alkylpolyglucoside. Non-limiting examples of alkylpolyglucosides include: (i) Glucopon® 215 CS UP, a $C_8$-$C_{10}$ alkyl group and an average of 1.5 glucose units per mole; (ii) Glucopon® 225 DK, a $C_8$-$C_{10}$ alkyl group and an average of 1.7 glucose units per mole; (iii) Glucopon® 425, a $C_8$-$C_{14}$ alkyl group and an average of 1.5 glucose units per mole; and (iv) Glucopon® 600 CS UP, a $C_{12}$-$C_{14}$ alkyl group and an average of 1.4 glucose units per mole.

When used as a non-ionic surfactant of the demulsifying composition, the alkylpolyglucoside may be present in the demulsifying composition in a range of 5 weight % to 100 weight % of the demulsifying composition, or in a range of 10 weight % to 95 weight % of the demulsifying composition, or in a range of 10 weight % to 90 weight % of the demulsifying composition, or in a range of 10 weight % to 85 weight % of the demulsifying composition, or in a range of 10 weight % to 70 weight % of the demulsifying composition, or in a range of 10 weight % to 60 weight % of the demulsifying composition, or in a range of 10 weight % to 50 weight % of the demulsifying composition, wherein all weight percentages are percent by weight of the total demulsifying composition.

The non-ionic surfactant of the demulsifying composition may be an alkylene glycol ester of a fatty acid moiety present in a plant oil. Alkylene glycols are also referred to as alkane diols. Alkylene glycol esters of fatty acids are mixtures of alkylene glycol monoesters and diesters of saturated and unsaturated fatty acids derived from oils and/or fats. For example, propylene glycol esters of fatty acids are mixtures of propylene glycol monoesters and diesters of saturated and unsaturated fatty acids derived from oils and/or fats. The products can be produced either by direct esterification of propylene glycol with fatty acids or by transesterification of propylene glycol with oils or fats. The process may be followed by molecular distillation to separate the monoesters. The structural formula of a propylene glycol ester of fatty acids is:

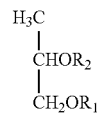

wherein $R_1$ and $R_2$ represent one fatty acid moiety and a hydrogen in the case of monoesters, and two fatty acid moieties in the case of diesters. Non-limiting example plant oils for forming an alkylene glycol ester used as a non-ionic surfactant of the demulsifying composition include castor oil, soybean oil, palm kernel oil, almond oil, corn oil, canola oil, rapeseed oil, and coconut oil. In the alkylene glycol esters of fatty acids, $C_{16}$-$C_{20}$ fatty acids are preferred, and $C_{16}$-$C_{20}$ fatty acids from soybean oil are most preferred.

When used as a non-ionic surfactant of the demulsifying composition, the alkylene glycol ester may be present in the demulsifying composition in a range of 5 weight % to 100 weight % of the demulsifying composition, or in a range of 10 weight % to 95 weight % of the demulsifying composition, or in a range of 10 weight % to 90 weight % of the demulsifying composition, or in a range of 10 weight % to 85 weight % of the demulsifying composition, or in a range of 10 weight % to 70 weight % of the demulsifying composition, or in a range of 10 weight % to 60 weight % of the demulsifying composition, or in a range of 10 weight % to 50 weight % of the demulsifying composition, wherein all weight percentages are percent by weight of the total demulsifying composition.

The non-ionic surfactant of the demulsifying composition may be an alkoxylated glycerol. The alkoxylated glycerol can have an average degree of alkoxylation in a range of 5 moles to 75 moles of alkoxylation per mole of plant oil. The alkoxylated glycerol can have an average degree of alkoxylation in a range of 5 moles to 60 moles of alkoxylation per mole of plant oil. The alkoxylated glycerol can have an average degree of alkoxylation in a range of 10 moles to 30 moles of alkoxylation per mole of polyol.

When used as a non-ionic surfactant of the demulsifying composition, the alkoxylated glycerol may be present in the demulsifying composition in a range of 5 weight % to 100 weight % of the demulsifying composition, or in a range of 10 weight % to 95 weight % of the demulsifying composition, or in a range of 10 weight % to 90 weight % of the demulsifying composition, or in a range of 10 weight % to 85 weight % of the demulsifying composition, or in a range of 10 weight % to 70 weight % of the demulsifying composition, or in a range of 5 weight % to 70 weight % of the demulsifying composition, or in a range of 10 weight % to 60 weight % of the demulsifying composition, or in a range of 10 weight % to 50 weight % of the demulsifying composition, wherein all weight percentages are percent by weight of the total demulsifying composition.

In one non-limiting example, the alkoxylated glycerol is an ethoxylated glycerol as in the following formula:

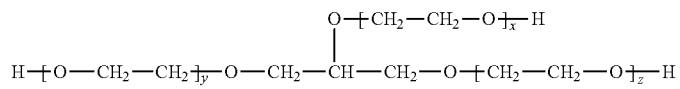

wherein x+y+z is in the range of 5 to 75.

In another non-limiting example, the alkoxylated glycerol is an ethoxylated polymerized glycerol as in the following formula:

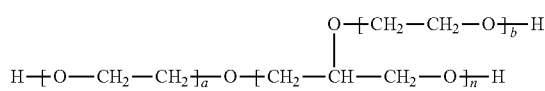

wherein a+b is in the range of 5 to 75, and n is an integer from 2 to 10.

The non-ionic surfactant of the demulsifying composition may be a polyglycerol ester of a fatty acid moiety present in a plant oil. When used as a non-ionic surfactant of the demulsifying composition, the polyglycerol ester of a fatty acid moiety of a plant oil may be present in the demulsifying composition in a range of 5 weight % to 100 weight % of the demulsifying composition, or in a range of 10 weight % to 95 weight % of the demulsifying composition, or in a range of 10 weight % to 90 weight % of the demulsifying composition, or in a range of 10 weight % to 85 weight % of the demulsifying composition, or in a range of 10 weight % to 70 weight % of the demulsifying composition, or in a range of 10 weight % to 60 weight % of the demulsifying composition, or in a range of 10 weight % to 50 weight % of the demulsifying composition, wherein all weight percentages are percent by weight of the total demulsifying composition.

The demulsifying composition may include an alkoxylated fatty acid. Fatty acids derived from various plant oils can be used in an alkoxylation reaction to produce the alkoxylated fatty acid of the demulsifying composition. Non-limiting example fatty acids for forming the alkoxylated fatty acid include capric acid, lauric acid, myristic acid, palmitic acid, linoleic acid, stearic acid, linolenic acid, and oleic acid. $C_{16}$-$C_{20}$ fatty acids are preferred, and $C_{16}$-$C_{20}$ fatty acids from soybean oil are most preferred. The alkoxylated fatty acid can have an average degree of alkoxylation in a range of 5 moles to 60 moles of alkoxylation per mole of fatty acid. The alkoxylated fatty acid can have an average degree of alkoxylation in a range of 5 moles to 45 moles of alkoxylation per mole of fatty acid.

The alkoxylated fatty acid may be present in the demulsifying composition in a range of 5 weight % to 95 weight % of the demulsifying composition, or in a range of 10 weight % to 90 weight % of the demulsifying composition, or in a range of 10 weight % to 85 weight % of the demulsifying composition, or in a range of 10 weight % to 70 weight % of the demulsifying composition, or in a range of 10 weight % to 60 weight % of the demulsifying composition, or in a range of 10 weight % to 50 weight % of the demulsifying composition, alkoxylated fatty acid alkoxylated fatty acid or in a range of 15 weight % to 45 weight % of the demulsifying composition, wherein all weight percentages are percent by weight of the total demulsifying composition.

In addition to the non-ionic surfactant, the demulsifying composition may optionally include polyethylene glycol and/or a polypropylene glycol and/or a polyethylene glycol derivative. Non-limiting example polyethylene glycol derivatives include a moiety derived from a plant oil, such as castor oil, soybean oil, palm kernel oil, almond oil, corn oil, canola oil, rapeseed oil, and coconut oil on the polyethylene glycol. In one non-limiting example, the polyethylene glycol derivative includes a moiety derived from soybean oil. The polyethylene glycol or polyethylene glycol derivative may have an average molecular weight of 100 to 700 daltons, or 300 to 500 daltons.

When the demulsifying composition includes polyethylene glycol and/or a polyethylene glycol derivative, the polyethylene glycol or polyethylene glycol derivative may be present in the demulsifying composition in a range of 10 weight % to 95 weight % of the demulsifying composition, or in a range of 10 weight % to 90 weight % of the demulsifying composition, or in a range of 10 weight % to 85 weight % of the demulsifying composition, or in a range of 10 weight % to 70 weight % of the demulsifying composition, or in a range of 10 weight % to 60 weight % of the demulsifying composition, or in a range of 10 weight % to 50 weight % of the demulsifying composition, wherein all weight percentages are percent by weight of the total demulsifying composition.

In addition to the non-ionic surfactant, the demulsifying composition may optionally include as an additional surfactant a PEG-ylated sorbitan esterified with fatty acids, commonly known as polysorbates. Non-limiting example polysorbates include polysorbate 20 (polyoxyethylene (20) sorbitan monolaurate), polysorbate 40 (polyoxyethylene (20) sorbitan monopalmitate), polysorbate 60 (polyoxyethylene (20) sorbitan monostearate), and polysorbate 80 (polyoxyethylene (20) sorbitan monooleate) wherein the number following the polyoxyethylene part refers to the total number of oxyethylene (—$CH_2CH_2O$—) groups found in the molecule.

When the demulsifying composition includes a polysorbate, the polysorbate may be present in the demulsifying composition in a range of 5 weight % to 95 weight % of the demulsifying composition, or in a range of 10 weight % to 90 weight % of the demulsifying composition, or in a range of 10 weight % to 85 weight % of the demulsifying composition, or in a range of 10 weight % to 70 weight % of the demulsifying composition, or in a range of 10 weight % to 60 weight % of the demulsifying composition, or in a range of 10 weight % to 50 weight % of the demulsifying composition, wherein all weight percentages are percent by weight of the total demulsifying composition.

In addition to the non-ionic surfactant, the demulsifying composition may optionally include an oil selected from mineral oil and plant oils, such as castor oil, soybean oil, palm kernel oil, almond oil, corn oil, canola oil, rapeseed oil, or coconut oil. When the demulsifying composition includes an oil, the oil may be present in the demulsifying composition in a range of 5 weight % to 95 weight % of the demulsifying composition, or in a range of 10 weight % to 90 weight % of the demulsifying composition, or in a range of 10 weight % to 85 weight % of the demulsifying composition, or in a range of 10 weight % to 70 weight % of the demulsifying composition, or in a range of 10 weight % to 60 weight % of the demulsifying composition, or in a range of 10 weight % to 50 weight % of the demulsifying composition, wherein all weight percentages are percent by weight of the total demulsifying composition.

In addition to the non-ionic surfactant, the demulsifying composition may optionally include water in a range of 5 weight % to 95 weight % of the demulsifying composition, or in a range of 10 weight % to 90 weight % of the demulsifying composition, or in a range of 10 weight % to 85 weight % of the demulsifying composition, or in a range of 10 weight % to 70 weight % of the demulsifying composition, or in a range of 10 weight % to 60 weight % of the demulsifying composition, or in a range of 10 weight % to 50 weight % of the demulsifying composition, wherein all weight percentages are percent by weight of the total demulsifying composition.

In one non-limiting example of the demulsifying composition for aiding extraction of an emulsified oil from an oil and water emulsion, the composition comprises: (i) a first non-ionic surfactant selected from the group consisting of alkoxylated plant oils, alkoxylated plant fats, alkoxylated animal oils, and alkoxylated animal fats; and (ii) a second non-ionic surfactant comprising an alkylene glycol ester of a fatty acid moiety present in a plant oil. The first non-ionic surfactant may comprise an alkoxylated plant oil wherein the alkoxylated plant oil is selected from the group consisting of ethoxylated castor oil, ethoxylated soybean oil, ethoxylated palm kernel oil, ethoxylated almond oil, ethoxylated corn oil, ethoxylated canola oil, ethoxylated rapeseed oil, and ethoxylated coconut oil. The alkoxylated plant oil may be ethoxylated castor oil. For the second non-ionic surfactant, the alkylene glycol ester can be a propylene glycol ester of a fatty acid moiety present in soybean oil. The composition includes silicon containing particles selected from hydrophilic silica, hydrophobic silica, and mixtures thereof. The composition may comprise 10 weight % to 70 weight % of the first non-ionic surfactant, and 10 weight % to 70 weight % of the second non-ionic surfactant, and 5 weight % to 15 weight % of the silicon containing particles, wherein all weight percentages are percent by weight of the total composition. The composition may comprise 30 weight % to 65 weight % of the alkoxylated castor oil, and 15 weight % to 60 weight % of the propylene glycol ester of a fatty acid moiety present in soybean oil, and 5 weight % to 15 weight % of hydrophobic silica, wherein all weight percentages are percent by weight of the total composition.

Another embodiment of the demulsifying composition for recovering oil from the corn to ethanol process may comprise polyethylene glycol and/or polypropylene glycol and/or a polyethylene glycol derivative. Non-limiting example polyethylene glycol derivatives include a moiety derived from a plant oil, such as castor oil, soybean oil, palm kernel oil, almond oil, corn oil, canola oil, rapeseed oil, and coconut oil on the polyethylene glycol chain. The polyethylene glycol or polyethylene glycol derivative may be present in the demulsifying composition in a range of 10 weight % to 95 weight % of the demulsifying composition, or in a range of 10 weight % to 90 weight % of the demulsifying composition, or in a range of 50 weight % to 90 weight % of the demulsifying composition, or in a range of 60 weight % to 80 weight % of the demulsifying composition, or in a range of 65 weight % to 75 weight % of the demulsifying composition, or in a range of 10 weight % to 85 weight % of the demulsifying composition, or in a range of 10 weight % to 70 weight % of the demulsifying composition, or in a range of 10 weight % to 60 weight % of the demulsifying composition, or in a range of 10 weight % to 50 weight % of the demulsifying composition, wherein all weight percentages are percent by weight of the total demulsifying composition.

In addition to the polyethylene glycol and/or polypropylene glycol and/or a polyethylene glycol derivative, the demulsifying composition of this embodiment may optionally include a polysorbate as described above. The polysorbate may be present in the demulsifying composition in a range of 5 weight % to 95 weight % of the demulsifying composition, or in a range of 10 weight % to 90 weight % of the demulsifying composition, or in a range of 10 weight % to 85 weight % of the demulsifying composition, or in a range of 10 weight % to 70 weight % of the demulsifying composition, or in a range of 10 weight % to 60 weight % of the demulsifying composition, or in a range of 10 weight % to 50 weight % of the demulsifying composition, wherein all weight percentages are percent by weight of the total demulsifying composition.

In addition to the polyethylene glycol and/or polypropylene glycol and/or a polyethylene glycol derivative, the demulsifying composition of this embodiment may optionally include an oil selected from mineral oil and plant oils, such as castor oil, soybean oil, palm kernel oil, almond oil, corn oil, canola oil, rapeseed oil, or coconut oil. When the demulsifying composition includes an oil, the oil may be present in the demulsifying composition in a range of 5 weight % to 95 weight % of the demulsifying composition, or in a range of 10 weight % to 90 weight % of the demulsifying composition, or in a range of 10 weight % to 85 weight % of the demulsifying composition, or in a range of 10 weight % to 70 weight % of the demulsifying composition, or in a range of 10 weight % to 60 weight % of the demulsifying composition, or in a range of 10 weight % to 50 weight % of the demulsifying composition, wherein all weight percentages are percent by weight of the total demulsifying composition.

In addition to the polyethylene glycol and/or polypropylene glycol and/or a polyethylene glycol derivative, the demulsifying composition of this embodiment may optionally include an alkylene glycol ester of one or more fatty acids derived from oils and/or fats as described above. The alkylene glycol ester may be present in the demulsifying composition in a range of 5 weight % to 100 weight % of the demulsifying composition, or in a range of 10 weight % to 95 weight % of the demulsifying composition, or in a range of 10 weight % to 90 weight % of the demulsifying composition, or in a range of 10 weight % to 85 weight % of the demulsifying composition, or in a range of 10 weight % to 70 weight % of the demulsifying composition, or in a range of 10 weight % to 60 weight % of the demulsifying composition, or in a range of 10 weight % to 50 weight % of the demulsifying composition, or in a range of 20 weight % to 40 weight % of the demulsifying composition, or in a range of 25 weight % to 35 weight % of the demulsifying composition, wherein all weight percentages are percent by weight of the total demulsifying composition.

In addition to the polyethylene glycol and/or polypropylene glycol and/or a polyethylene glycol derivative, the demulsifying composition of this embodiment may optionally include silicon containing particles at a level of 0.1 wt. % to 30 wt. %, more preferably, a level of 5 wt. % to 15 wt. %, and most preferably, at a level of up to 15 wt. % the silicon containing particles, wherein all weight percentages are percent by weight of the total demulsifying composition. The silicon containing particles are preferably selected from silica, talc, clay, diatomaceous earth, and mixtures thereof. The silicon containing particles can be precipitated or fumed. The silicon containing particles can be hydrophilic or hydrophobic. Preferably, the silicon containing particles are precipitated hydrophilic silica particles. The silicon containing particles can have an average particle size of less than 100 micrometers, more preferably an average particle size of less than 50 micrometers, and most preferably an average particle size of less than 20 micrometers.

In addition to the polyethylene glycol and/or a polyethylene glycol derivative, the demulsifying composition of this embodiment may optionally include water in a range of 5 weight % to 95 weight % of the demulsifying composition, or in a range of 10 weight % to 90 weight % of the demulsifying composition, or in a range of 10 weight % to 85 weight % of the demulsifying composition, or in a range of 10 weight % to 70 weight % of the demulsifying composition, or in a range of 10 weight % to 60 weight % of the demulsifying composition, or in a range of 10 weight % to 50 weight % of the demulsifying composition, wherein all weight percentages are percent by weight of the total demulsifying composition.

Yet another embodiment of the demulsifying composition for recovering oil from the corn to ethanol process may comprise (i) an alkoxylated fatty acid and (ii) an oil selected from the group consisting of mineral oils and plant oils.

Fatty acids derived from various plant oils can be used in an alkoxylation reaction to produce the alkoxylated fatty acid of the demulsifying composition of this embodiment. Non-limiting example fatty acids for forming the alkoxylated fatty acid include capric acid, lauric acid, myristic acid, palmitic acid, linoleic acid, stearic acid, linolenic acid, and oleic acid. $C_{16}$-$C_{20}$ fatty acids are preferred, and $C_{16}$-$C_{20}$ fatty acids from soybean oil are most preferred. The alkoxylated fatty acid can have an average degree of alkoxylation in a range of 5 moles to 60 moles of alkoxylation per mole of fatty acid. The alkoxylated fatty acid can have an average degree of alkoxylation in a range of 5 moles to 45 moles of alkoxylation per mole of fatty acid.

The alkoxylated fatty acid may be present in the demulsifying composition in a range of 5 weight % to 95 weight % of the demulsifying composition, or in a range of 10 weight % to 90 weight % of the demulsifying composition, or in a range of 10 weight % to 85 weight % of the demulsifying composition, or in a range of 10 weight % to 70 weight % of the demulsifying composition, or in a range of 10 weight % to 60 weight % of the demulsifying composition, or in a range of 10 weight % to 50 weight % of the demulsifying composition, or in a range of 15 weight % to 45 weight % of the demulsifying composition, wherein all weight percentages are percent by weight of the total demulsifying composition.

The oil can be selected from mineral oil and plant oils, such as castor oil, soybean oil, palm kernel oil, almond oil, corn oil, canola oil, rapeseed oil, or coconut oil. The oil may be present in the demulsifying composition in a range of 5 weight % to 95 weight % of the demulsifying composition, or in a range of 10 weight % to 90 weight % of the demulsifying composition, or in a range of 10 weight % to 85 weight % of the demulsifying composition, or in a range of 10 weight % to 70 weight % of the demulsifying composition, or in a range of 50 weight % to 70 weight % of the demulsifying composition, or in a range of 10 weight % to 60 weight % of the demulsifying composition, or in a range of 10 weight % to 50 weight % of the demulsifying composition, wherein all weight percentages are percent by weight of the total demulsifying composition.

In addition to the alkoxylated fatty acid and oil, the demulsifying composition of this embodiment may optionally include silicon containing particles at a level of 0.1 wt. % to 30 wt. %, more preferably, a level of 5 wt. % to 15 wt. %, and most preferably, at a level of up to 15 wt. % the silicon containing particles, wherein all weight percentages are percent by weight of the total demulsifying composition. The silicon containing particles are preferably selected from silica, talc, clay, diatomaceous earth, and mixtures thereof. The silicon containing particles can be precipitated or fumed. The silicon containing particles can be hydrophilic or hydrophobic. Preferably, the silicon containing particles are precipitated hydrophilic silica particles. The silicon containing particles can have an average particle size of less than 100 micrometers, more preferably an average particle size of less than 50 micrometers, and most preferably an average particle size of less than 20 micrometers.

In addition to the alkoxylated fatty acid and oil, the demulsifying composition of this embodiment may optionally include water in a range of 5 weight % to 95 weight % of the demulsifying composition, or in a range of 10 weight % to 90 weight % of the demulsifying composition, or in a range of 10 weight % to 85 weight % of the demulsifying composition, or in a range of 10 weight % to 70 weight % of the demulsifying composition, or in a range of 10 weight % to 60 weight % of the demulsifying composition, or in a range of 10 weight % to 50 weight % of the demulsifying composition, wherein all weight percentages are percent by weight of the total demulsifying composition.

EXAMPLES

The following Examples have been presented in order to further illustrate the invention and are not intended to limit the invention in any way.

Example 1

Surfactants have the ability to competitively absorb at an air water, or oil water interface, displacing absorbed proteins via an orogenic mechanism. The orogenic mechanism occurs in a number of steps. In the case of protein stabilized air, a non-ionic surfactant that is more stable than the absorbed protein will add at a weak point in the protein stabilizing matrix. Surfactant will continue to add to the weak point. As surface pressure builds on the interface, the protein will start to condense giving way to the more stable surfactant. At some critical surface pressure, the protein matrix will collapse releasing the air bubble.

Differences in the number addition sites and the relative surface pressure leading to matrix collapse were observed for ionic and non-ionic surfactants. For ionic surfactants, more nucleation sites at the air water interface were present compared to non-ionic surfactant. This can be attributed to electrostatic repulsion between individual surfactant molecules. As the initial point of nucleation grows, so does the repulsive charge at that site, thus making additional sites of nucleation more energetically favorable. The difference in surface pressure could be attributed to the method of nucleation (more sites vs. less sites) or increased surfactant-protein interaction due to charged surfactant head groups.

Competitive displacement of oil body proteins with surfactants was studied. Differences in non-ionic surfactants were observed using polysorbate 20 (polyoxyethylene (20) sorbitan monolaurate) and polysorbate 60 (polyoxyethylene (20) sorbitan monostearate) wherein the number following the polyoxyethylene part refers to the total number of oxyethylene —($CH_2CH_2O$)— groups found in the molecule. While both surfactants broke the protein matrix at the same surface pressure, more polysorbate 60 was needed to get to that pressure. This can be attributed to tighter packing due to polysorbate 60 having a longer hydrophobic chain. This could affect polysorbate 60 efficiency in a number of ways: polysorbate 60 may have a harder time adding to nucleated sites due reduced monolayer fluidity, more polysorbate 60 may have to be absorbed at the interface to displace the same amount space, or polysorbate 60 may diffuse through solution at a slower rate than polysorbate 20.

Competitive displacement of oil body protein by polysorbate 80 (polyoxyethylene (20) sorbitan monooleate) was also studied. It was shown that at low levels of polysorbate 80, less stable surface active proteins called caleosins and steroleosin were displaced. At higher levels of polysorbate 80, oleosin was displaced, but not completely. This is due to the stability of oleosin relative to other oil body proteins.

In general, oil body proteins are more stable than other common surface active proteins like those found in milk or egg yolk. This is important in context of oil demulsification, since rigorous process conditions (temperature, pH, mechanical action) could cause a portion of the oil body proteins to become denatured, thus leaving them less surface stable. Think of an active protein as a ball of yarn. Putting ten balls of yarn in a box is not a problem, but stretch the yarn out and it quickly becomes a tangled mess.

If some of the proteins are denatured, these proteins would interact with surrounding proteins more readily, and have been shown to form a viscoelastic mesh, preventing oil coalescence via a surrounding protein barrier. This viscoelastic barrier increases emulsion stability in isolated oil bodies that cream rapidly in the absence of such a barrier. Since denatured proteins no longer have the same surface activity, the addition of a surface active surfactant would selectively kick off the denatured proteins and allow the oil body to shed its protective protein barrier. These newly freed oil bodies, covered by surfactant and intact oil body proteins, would have the ability to collide with one another facilitating the first step of coalescence.

Polysorbate 80 currently out-performs polysorbate 20, polysorbate 40 (polyoxyethylene (20) sorbitan monopalmitate), and polysorbate 60. According to polysorbate 80's role in the competitive absorption mechanism, that this dominance can be explained by polysorbate 80's unique optimization of three contributing factors: interface affinity, packing, and surfactant diffusivity.

Interface affinity indicates the affinity of the surfactant to the oil water interface. If the surfactant has a higher affinity to the interface than the protein, the surfactant will competitively displace the protein. This factor not only has to do with the relative ratio of hydrophobic to hydrophilic portions (HLB number), but also the size of the molecule. A larger molecule, with the exact same HLB number as a smaller molecule, will be have a greater affinity to the interface. Interestingly, phospholipids, the molecules making up the lipid bilayer of all cellular organisms, contain two fatty acid chains with lengths ranging between 14 and 24 carbons long. The composition of corn oil is generally 55% linoleic acid (18:2), 23% oleic acid (18:1), and 12% palmitic (16:0). Since the phospholipid bilayer is often representative of the fatty acids available in the cell, it can be concluded that the phospholipids present are mostly between 16 and 18 carbons long. This could indicate that the surfactant with the maximum chain interactions leading to the highest interfacial affinity would have chain lengths between 16 and 18 carbons long.

Packing refers to how densely absorbed a surfactant is on an interface. Packing in a bi-lipid membrane, such as the phospholipid membranes found in cells, is contingent upon packing conditions of the surfactant head and tail groups. The larger hydrophobic head group on polysorbate 80 could explain its dominance over other surfactants. Not only would this large head take up more area, it also makes the lipid packing ratio <1. This indicates that the molecules hydrophilic head takes up more space than the hydrophobic tail, and therefore causes the most stable geometry of the surface to increase in curvature. In addition, the unsaturated fatty acid hydrophobic tail on polysorbate 80, will pack less tightly than saturated fatty acid chains (polysorbate 20, polysorbate 40, and polysorbate 60) and would lead to a membrane that is more fluidic. A fluidic membrane could facilitate surfactant diffusion onto the membrane, thus altering the kinetics of the competitive displacement mechanism in favor of the surfactant.

Example 2

Upon collision, the oil globules will either come together (coalesce) or move apart. The probability of coalescence depends on the presence of surfactant (oil body proteins, phospholipids, polysorbate 80) at the oil water interface. If the oil is covered in intact oleosins, the probability of coalescence will be small. If some of these proteins are removed or denatured, the probability of coalescence will increase.

Hydrophobic precipitated silica particles are porous particles treated with siloxane polymer chains. These chains are of variable length and cause the silica to be hydrophobic. Protein buildup on siloxane treated hydrophobic surfaces is well documented. This is thought to be a result of hydrophobic interactions, and leads to protein adhesion and subsequent denaturation on the silica surface.

Without intending to be bound by theory, there are a few different ways in which the silica could be acting. The first is as a fining agent that removes protein from the aqueous phase. This could explain the observation that the oil obtained using the polysorbate 80+silica vs. straight polysorbate 80 appeared less cloudy. Silica may actively strip protein from oil globules which brush by, or act as a protein-sink in the polysorbate 80 facilitated protein desorption and transportation away from the oil-water interface.

Silica could also promote coalescence by providing a surface around which oil bodies collect and eventually coalesce. Due to its highly hydrophobic surface, oil has been shown to preferentially wet a hydrophobic silica particle's surface. Therefore with a silica particle present, two oil globules which would normally move apart after collision would now be stuck together. This would increase their time in close proximity and thus increase the probability of coalescence.

Example 3

Corn oil demulsification tests were performed. The demulsification properties of a dispersion containing 80 wt. % water, 10 wt. % hydrophilic precipitated silica particles, and 10 wt. % polysorbate 80 (Dispersion 1) was compared to 100% polysorbate. Dispersion 1 had superior demulsification properties.

The demulsification properties of a dispersion containing 70 wt. % water, 10% hydrophilic precipitated silica particles, and 20% polysorbate 80 (Dispersion 2) was compared to 100% polysorbate. Dispersion 2 had better demulsification properties.

Example 4

Corn oil demulsification tests were performed. The corn oil demulsification properties of Formulation Numbers 1 to 16 in Table 1 below were investigated. Each formulation had corn oil demulsification properties.

TABLE 1

| Formulation No. ---> | HLB | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|---|
| Component | | | | | | | | | | | | | | | | | |
| White Mineral Oil | | 60 | 60 | 60 | 60 | 60 | | | | | | | | | | | |
| Polyoxyethylene Oleate (9 moles of ethoxylation) | 12 | 20 | 10 | | | | | | | | | | | | | | |
| Polyoxyethylene monostearate (40 moles of ethoxylation) | 17.2 | 10 | 20 | | | | | | | | | | | | | | |
| Hydrophobic Silica | | 10 | 10 | 10 | 10 | 10 | 10 | 10 | 10 | | 10 | 10 | 10 | 10 | | | |
| Castor Oil Ethoxylate (40 moles of ethoxylation) | 13 | | | 10 | 18 | 20 | 30 | 54 | 60 | 100 | 90 | | | | | 10 | |
| Glycerol Ethoxylate (12 moles of ethoxylation) | 17 | | | 20 | | | 60 | | | | | | | | | | |
| Glycerol Ethoxylate (26 moles of ethoxylation) | 18.4 | | | | 12 | | | 36 | | | | | | | | | |
| PEG 400 Polyethylene glycol (average $M_n$ 400) | 20 | | | | | 10 | | 30 | | | | | | | | | |
| Polysorbate 80 | 15 | | | | | | | | | | | 90 | 80 | 35 | 45 | 10 | |
| Propylene Glycol Ester of Fatty Acids from Vegetable Oil | 3 | | | | | | | | | | | | 10 | 55 | 37 | | |
| Hydrophilic Silica | | | | | | | | | | | | | | 8 | 10 | 10 | |
| Water | | | | | | | | | | | | | | 10 | 80 | 80 | |

All numbers are percent by weight of the total composition.

Example 5

Corn oil demulsification tests were performed in a corn to ethanol plant.

Materials Used in Example 5

The 40 mole ethoxylated castor oil used was Croda 1284, which is a castor oil ethoxylate with an average of 40 moles of ethoxylation per mole of castor oil.

The Polyglycerol Ester used was obtained from Lambent Technologies under the product designation Lumulse POE (26) Glyc. It includes polymerized glycerol and has an average of 26 moles of ethoxylation per mole of polymerized glycerol.

The Alkyl Polyglucoside used was BASF Glucopon® 225 DK, an alkylpolyglucoside including a $C_8$-$C_{10}$ alkyl group and an average of 1.7 glucose units per mole of alkylpolyglucoside.

Peg 400 used was polyethylene glycol having an average molecular weight of 400 daltons.

Peg 400 MO used was polyethylene glycol monooleate having an average molecular weight of 400 daltons.

Peg 400 DO used was polyethylene glycol dioleate having an average molecular weight of 400 daltons.

PEG 400 Mono Soyate used was an ester of polyethylene glycol (having an average molecular weight of 400 daltons) and fatty acids derived from soybean oil.

Soybean oil is a triglyceride typically including fatty acids as follows: myristic 0.1%; palmitic 11.0%; palmitoleic 0.1%; stearic 4.0%; oleic 23.4%; linoleic 53.2%; linolenic 7.8%; arachidic 0.3%; and behenic 0.1%.

The hydrophobic silica used was available as PP-35-FGK.

The hydrophilic silica used was available as Sipernat 35.

The FC3560 used was a mixture of propylene glycol monoesters and diesters of fatty acids derived from soybean oil.

Polysorbate 80 is available as Tween 80 which is (polyoxyethylene (20) sorbitan monooleate) and is shown below.

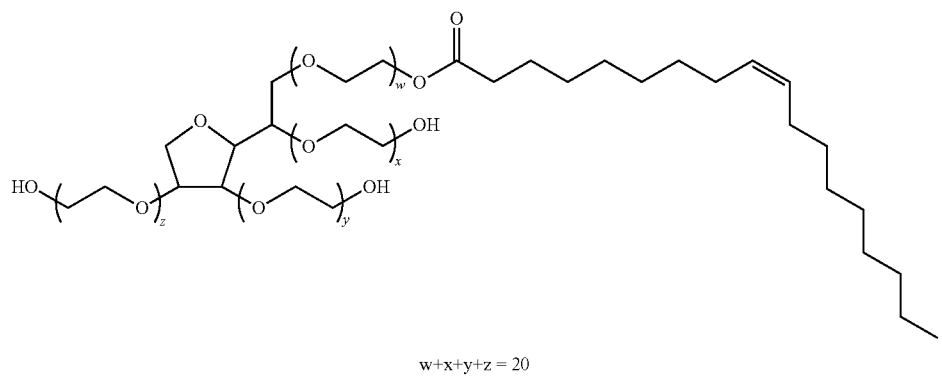

(Tween 80)

w+x+y+z = 20

Formula BD1 was 80 weight % Polysorbate 80, 10 weight % of a mixture of propylene glycol monoesters and diesters of fatty acids derived from soybean oil, and 10 weight % hydrophobic silica.

Formula BD2 was 90 weight % Polysorbate 80, and 10 weight % hydrophobic silica.

Formula BD3 was 35 weight % Polysorbate 80, 55 weight % of a mixture of propylene glycol monoesters and diesters of fatty acids derived from soybean oil, 9 weight % hydrophobic silica, and 1 weight % hydrophilic silica.

Formula BD4 was 45 weight % Polysorbate 80, 37 weight % of a mixture of propylene glycol monoesters and diesters of fatty acids derived from soybean oil, 8 weight % hydrophilic silica, and 10 weight % water.

Formula BD5 was 60 weight % of a castor oil ethoxylate with an average of 40 moles of ethoxylation per mole of castor oil, 20 weight % of a mixture of propylene glycol monoesters and diesters of fatty acids derived from soybean oil, 10 weight % water, and 10 weight % hydrophobic silica.

Formula BD6 was 45 weight % of a castor oil ethoxylate with an average of 40 moles of ethoxylation per mole of castor oil, 45% of a mixture of propylene glycol monoesters and diesters of fatty acids derived from soybean oil, and 10 weight % hydrophobic silica.

Formula BD7 was 35% of a castor oil ethoxylate with an average of 40 moles of ethoxylation per mole of castor oil, 55 weight % of a mixture of propylene glycol monoesters and diesters of fatty acids derived from soybean oil, 9 weight % hydrophobic silica, and 1 weight % hydrophilic silica.

The Oxiteno Alkest CSO 400H used is a castor oil ethoxylate with an average of 40 moles of ethoxylation per mole of castor oil.

The 20 mole ethoxylated castor oil used was Croda 1292 which is a castor oil ethoxylate with an average of 20 moles of ethoxylation per mole of castor oil.

The Akzo Emulpon CO-550 used is a castor oil ethoxylate with an average of 55 moles of ethoxylation per mole of castor oil.

The Crodasol HS HP-SO-(MH) used is a non-ionic surfactant including monoesters and diesters of 12-hydroxystearic acid formed by ethoxylation of 12-hydroxystearic acid.

The Crovol A70-SS-(MH) used is PEG-60 almond oil, an ethoxylated almond oil non-ionic surfactant.

The Crovol PK 70-LQ-(MH) used is a palm kernel oil ethoxylate non-ionic surfactant with an average of 45 moles of ethoxylation per mole of palm kernel oil.

Methods Used in Example 5

The corn oil demulsification properties of formulations having Test Identifiers A to BD15 in Tables 2, 3, 4, and 5 below were investigated in a corn to ethanol plant. In Tables 2, 3, 4, and 5, all weight percentages are percent by weight of the total demulsifying composition. The syrup flow rate was 65 gallons/minute. The syrup temperature was 165° F. The plant used a disk stack centrifuge for separating out the corn oil. The syrup solids was 33-35%. The rate of addition of the test formulation having Identifiers A to BD15 was 65 milliliters/minute or 203 ppm.

In the test procedure, 40 milliliters of syrup sample was dispensed into a clean 50 milliliter centrifuge tube and labeled appropriately. The desired concentration of the test formulation was injected using a microdispenser into the syrup sample. The centrifuge tubes were shaked vigorously for 15 seconds to adequately mix in the test formulation. The freshly mixed tubes were placed in a centrifuge unit for 5 minutes at 5000 RPM. Then, the centrifuge tubes were carefully removed so as to not disturb the layers of separation. The oil layer and the protein layer were measured to the most accurate plus/minus 0.5 millimeters, and the measurement was recorded. Corn oil separation was indicated by formation of at least trace amounts of an oil layer.

Determination of Dosing: We chose the Formula BD6 to benchmark the demulsifer dosing requirements. The Formula BD6 was then introduced to the freshly sourced syrup at 100, 200, 300, 400, 500 ppm and compared to a control sample with no chemistry incorporated. It was determined that a dosing of 200 ppm of demulsifier is an adequate concentration for incorporation to observe differences in chemical performance.

TABLE 2

| Test Identifier | Component A | Component A Wt. % | Component B | Component B Wt. % | Component C | Component C Wt. % | Dosing (ppm) | Protein Layer | Oil Layer |
|---|---|---|---|---|---|---|---|---|---|
| A | 40 mole ethoxylated castor oil | 100% | — | — | — | — | 200 | 2.5 mm | 4.5 mm |
| B | Polyglycerol Ester | 100% | — | — | — | — | 200 | 5.5 mm | trace amounts |
| C | Alkyl Polyglucoside | 100% | — | — | — | — | 200 | 5.5 mm | trace amounts |
| *Control | no chemistry added | — | — | — | — | — | 0 | 7 mm | trace amounts |
| Aa1 | 40 mole ethoxylated castor oil | 95% | Hydrophobic Silica | 5% | — | — | 200 | 2 mm | 5.5 mm |
| Aa2 | 40 mole ethoxylated castor oil | 95% | Hydrophilic Silica | 5% | — | — | 200 | 2.5 mm | 5 mm |
| Aa3 | 40 mole ethoxylated castor oil | 90% | Hydrophobic Silica | 10% | — | — | 200 | 0.5 mm | 5 mm |
| Aa4 | 40 mole ethoxylated castor oil | 85% | Hydrophobic Silica | 15% | — | — | 200 | 1 mm | 5.5 mm |

TABLE 3

| Test Identifier | Component A | Component A Wt. % | Component B | Component B Wt. % | Component C | Component C Wt. % | Dosing (ppm) | Protein Layer | Oil Layer |
|---|---|---|---|---|---|---|---|---|---|
| Ba | Polyglycerol Ester | 90% | Hydrophobic Silica | 10% | — | — | 200 | 3 mm | 0.5 mm |
| Ca | Alkyl Polyglucoside | 90% | Hydrophobic Silica | 10% | — | — | 200 | 3 mm | 1.5 mm |
| Ab | 40 mole ethoxylated castor oil | 90% | PEG 400 Mono Soyate | 10% | — | — | 200 | 2.5 mm | 4 mm |
| Ac | 40 mole ethoxylated castor oil | 90% | FC3560 | 10% | — | — | 200 | 3 mm | 3.5 mm |
| Ad | 40 mole ethoxylated castor oil | 90% | Water | 10% | — | — | 200 | 3 mm | 3.5 mm |
| Ae | 40 mole ethoxylated castor oil | 90% | Soybean Oil | 10% | — | — | 200 | 3.5 mm | 3.0 mm |
| Ada | 40 mole ethoxylated castor oil | 10% | Water | 80% | Hydrophilic Silica | 10% | 200 | 6 mm | trace amounts |
| Bda | Polyglycerol Ester | 10% | Water | 80% | Hydrophilic Silica | 10% | 200 | 6 mm | 1 mm |
| Cda | Alkyl Polyglucoside | 10% | Water | 80% | Hydrophilic Silica | 10% | 200 | 6 mm | trace amounts |

TABLE 4

| Test Identifier | Component A | Component A Wt. % | Component B | Component B Wt. % | Component C | Component C Wt. % | Dosing (ppm) | Protein Layer | Oil Layer |
|---|---|---|---|---|---|---|---|---|---|
| A1 | Peg 400 | 100% | — | — | — | — | 200 | 5.5 mm | trace amounts |
| A2 | Peg 400 MO | 100% | — | — | — | — | 200 | 6.5 mm | trace amounts |
| A3 | Peg 400 DO | 100% | — | — | — | — | 200 | 7 mm | trace amounts |

TABLE 4-continued

| Test Identifier | Component A | Component A Wt. % | Component B | Component B Wt. % | Component C | Component C Wt. % | Dosing (ppm) | Protein Layer | Oil Layer |
|---|---|---|---|---|---|---|---|---|---|
| A4 | PEG 400 Mono Soyate | 100% | — | — | — | — | 200 | 6.5 mm | trace amounts |
| A5 | 40 mole ethoxylated castor oil | 100% | — | — | — | — | 200 | 2 mm | 3.5 mm |
| A6 | 20 mole ethoxylated castor oil | 100% | — | — | — | — | 200 | 2 mm | 4.5 mm |
| A7 | Peg 400 | 70% | FC3560 | 30% | — | — | 200 | 6 mm | .5 mm |
| A8 | Peg 400 | 70% | Polysorbate 80 | 30% | — | — | 200 | 2.5 mm | 2.5 mm |
| A9 | Peg 400 | 70% | Soybean Oil | 30% | — | — | 200 | 5 mm | trace amounts |

TABLE 5

| Test Identifier | Component A | Component A Wt. % | Component B | Component B Wt. % | Component C | Component C Wt. % | Dosing (ppm) | Protein Layer | Oil Layer |
|---|---|---|---|---|---|---|---|---|---|
| BD1 | Formula BD1 | 100% | — | — | — | — | 200 | 1.5 mm | 5.5 mm |
| BD2 | Formula BD2 | 100% | — | — | — | — | 200 | 1 mm | 5 mm |
| BD3 | Formula BD3 | 100% | — | — | — | — | 200 | 1 mm | 3 mm |
| BD4 | Formula BD4 | 100% | — | — | — | — | 200 | 2 mm | 3 mm |
| BD5 | Formula BD5 | 100% | — | — | — | — | 200 | 1.5 mm | 5.5 mm |
| BD6 | Formula BD6 | 100% | — | — | — | — | 200 | 1.5 mm | 5.5 mm |
| BD7 | Formula BD7 | 100% | — | — | — | — | 200 | 1 mm | 4.5 mm |
| BD8 | Oxiteno Alkest CSO 400 H | 100% | — | — | — | — | 200 | 2 mm | 5 mm |
| BD9 | 40 mole ethoxylated castor oil | 100% | — | — | — | — | 200 | 2 mm | 5 mm |
| BD10 | 20 mole ethoxylated castor oil | 100% | — | — | — | — | 200 | 3 mm | 5 mm |
| BD11 | Polysorbate 80 | 100% | — | — | — | — | 200 | 2 mm | 5 mm |
| BD12 | Akzo Emulpon CO-550 | 100% | — | — | — | — | 200 | 5.5 mm | trace amounts |
| BD13 | Crodasol HS HP-SO-(MH) | 100% | — | — | — | — | 200 | 4.5 mm | 2.5 mm |
| BD14 | Crovol A70-SS-(MH) | 100% | — | — | — | — | 200 | 3.5 mm | 3.5 mm |
| BD15 | Crovol PK 70-LQ-(MH) | 100% | — | — | — | — | 200 | 3 mm | 3.5 mm |

Thus, the invention provides compositions and methods for aiding the extraction of an emulsified oil from an oil and water emulsion. In one version of the invention used in a dry-mill ethanol process, significant corn oil coalescence can occur before separation of the corn oil by centrifuging or decantation. This increases the amount of corn oil recovered during centrifuging and/or decantation.

Although the present invention has been described in detail with reference to certain embodiments, one skilled in the art will appreciate that the present invention can be practiced by other than the described embodiments, which have been presented for purposes of illustration and not of limitation. Therefore, the scope of the appended claims should not be limited to the description of the embodiments contained herein.

What is claimed is:

1. A method for recovering oil from a corn to ethanol process, the method comprising:
   adding a composition to a process stream of the corn to ethanol process,
   wherein the composition comprises 45 weight % to 95 weight % of a non-ionic surfactant selected from the group consisting of alkoxylated plant oils, alkoxylated plant fats, alkoxylated animal oils, alkoxylated animal fats, alkyl polyglucosides, alkoxylated glycerols, and mixtures thereof.

2. The method of claim 1 wherein:
   the alkoxylated plant oil is selected from the group consisting of ethoxylated castor oil, ethoxylated soybean oil, ethoxylated palm kernel oil, ethoxylated almond oil, ethoxylated corn oil, ethoxylated canola oil, ethoxylated rapeseed oil, and ethoxylated coconut oil.

3. The method of claim 2 wherein:
the alkoxylated plant oil is ethoxylated castor oil.

4. The method of claim 2 wherein:
the composition further comprises an alkylene glycol ester of a fatty acid moiety present in a plant oil.

5. The method of claim 1 wherein:
the alkoxylated plant oil is ethoxylated castor oil, and
the composition further comprises an alkylene glycol ester of a fatty acid moiety present in a plant oil, and
the composition further comprises silicon containing particles.

6. The method of claim 1 wherein:
the non-ionic surfactant comprises an alkoxylated glycerol.

7. The method of claim 1 wherein:
the non-ionic surfactant comprises an alkylpolyglucoside.

8. The method of claim 1 wherein:
the composition further comprises polyethylene glycol or a polyethylene glycol derivative.

9. The method of claim 1 wherein:
the non-ionic surfactant has an HLB value of 6 or greater.

10. The method of claim 1 wherein:
the composition further comprises silicon containing particles.

11. The method of claim 1 wherein:
the composition further comprises a polysorbate.

12. A method for recovering oil from a corn to ethanol process, the method comprising:
adding a composition to a process stream of the corn to ethanol process,
wherein the composition comprises 50 weight % to 95 weight % of polyethylene glycol and/or polypropylene glycol or a polyethylene glycol derivative including a moiety derived from a plant oil.

13. The method of claim 12 wherein:
the composition further comprises a plant oil.

14. The method of claim 13 wherein:
the composition comprises 50 weight % to 90 weight % of polyethylene glycol and 10 weight % to 50 weight % of the plant oil,
wherein all weight percentages are percent by weight of the total composition.

15. The method of claim 14 wherein:
the plant oil is soybean oil.

16. The method of claim 12 wherein:
the composition further comprises a polysorbate.

17. The method of claim 16 wherein:
the composition comprises 50 weight % to 90 weight % of polyethylene glycol and 10 weight % to 50 weight % of polysorbate,
wherein all weight percentages are percent by weight of the total composition.

18. The method of claim 12 wherein:
the composition further comprises an alkylene glycol ester of a fatty acid moiety present in a plant oil.

19. The method of claim 18 wherein:
the composition comprises 50 weight % to 90 weight % of polyethylene glycol and 10 weight % to 50 weight % of the alkylene glycol ester of a fatty acid moiety present in a plant oil,
wherein all weight percentages are percent by weight of the total composition.

20. A method for recovering oil from a corn to ethanol process, the method comprising:
adding a composition to a process stream of the corn to ethanol process,
wherein the composition comprises (i) 50 weight % to 95 weight % of an alkoxylated fatty acid and (ii) an oil selected from the group consisting of mineral oils and plant oils.

21. The method of claim 20 wherein:
the composition further comprises silicon containing particles.

22. The method of claim 20 wherein:
the oil is mineral oil.

23. The method of claim 22 wherein:
the composition comprises:
(i) 15 weight % to 45 weight % of the alkoxylated fatty acid, and
(ii) 50 weight % to 70 weight % of mineral oil, and
(iii) 5 weight % to 15 weight % of the silicon containing particles,
wherein all weight percentages are percent by weight of the total composition.

24. A composition for aiding extraction of an emulsified oil from an oil and water emulsion, the composition comprising:
a first non-ionic surfactant selected from the group consisting of alkoxylated plant oils, alkoxylated plant fats, alkoxylated animal oils, and alkoxylated animal fats; and
a second non-ionic surfactant comprising a propylene glycol ester of a fatty acid moiety present in a plant oil.

25. The composition of claim 24 wherein:
the first non-ionic surfactant is an alkoxylated plant oil is selected from the group consisting of ethoxylated castor oil, ethoxylated soybean oil, ethoxylated palm kernel oil, ethoxylated almond oil, ethoxylated corn oil, ethoxylated canola oil, ethoxylated rapeseed oil, and ethoxylated coconut oil.

26. The composition of claim 25 wherein:
the alkoxylated plant oil is ethoxylated castor oil.

27. The composition of claim 26 further comprising:
silicon containing particles.

28. The composition of claim 27 wherein:
the first non-ionic surfactant comprises an alkoxylated castor oil,
the propylene glycol ester is a propylene glycol ester of a fatty acid moiety present in soybean oil,
the silicon containing particles comprise hydrophobic silica, and
the composition comprises:
30 weight % to 65 weight % of the alkoxylated castor oil, and
15 weight % to 60 weight % of the propylene glycol ester of a fatty acid moiety present in soybean oil, and
5 weight % to 15 weight % of the silicon containing particles,
wherein all weight percentages are percent by weight of the total composition.

* * * * *